US007082529B2

(12) United States Patent
Cantwell et al.

(10) Patent No.: US 7,082,529 B2
(45) Date of Patent: Jul. 25, 2006

(54) METHOD AND APPARATUS FOR CAPTURING DISPLAY CHARACTERISTIC INFORMATION TO ACHIEVE FASTER BOOT AND RESUME OF AN INFORMATION HANDLING SYSTEM

(75) Inventors: Thomas Cantwell, Liberty Hill, TX (US); Geoffrey Dunlap, Austin, TX (US); Joe E. Goodart, Austin, TX (US); Yuan-Chang Lo, Austin, TX (US); Roy W. Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 505 days.

(21) Appl. No.: 10/423,150

(22) Filed: Apr. 25, 2003

(65) Prior Publication Data
US 2004/0215953 A1 Oct. 28, 2004

(51) Int. Cl.
*G06F 1/24* (2006.01)
(52) U.S. Cl. ...................... 713/100; 710/104
(58) Field of Classification Search ............... 710/104; 713/100
See application file for complete search history.

(56) References Cited

U.S. PATENT DOCUMENTS

| 4,897,812 | A | * | 1/1990 | Lessard |
| 4,991,023 | A | * | 2/1991 | Nicols |
| 5,036,481 | A | * | 7/1991 | Lunsford et al. |
| 5,448,697 | A | * | 9/1995 | Parks et al. |
| 5,483,260 | A | * | 1/1996 | Parks et al. |
| 5,675,364 | A | * | 10/1997 | Stedman et al. |
| 5,682,529 | A | * | 10/1997 | Hendry et al. ............... 713/100 |
| 5,696,978 | A | * | 12/1997 | Nishikawa |
| 5,808,693 | A | * | 9/1998 | Yamashita et al. |
| 5,872,967 | A | * | 2/1999 | DeRoo et al. |
| 6,057,860 | A | * | 5/2000 | Hoffert et al. |
| 6,134,616 | A | * | 10/2000 | Beatty ........................ 710/104 |
| 6,223,283 | B1 | * | 4/2001 | Chaiken et al. |
| 6,348,910 | B1 | * | 2/2002 | Yamamoto et al. |
| 6,373,476 | B1 | * | 4/2002 | Dalgleish et al. |
| 6,404,324 | B1 | * | 6/2002 | Witt et al. |
| 6,480,903 | B1 | * | 11/2002 | Voutaz et al. |
| 6,697,033 | B1 | * | 2/2004 | Leung et al. ................... 345/5 |
| 6,721,881 | B1 | * | 4/2004 | Bian et al. ...................... 713/1 |
| 6,928,543 | B1 | * | 8/2005 | Hendry et al. ............... 713/100 |

OTHER PUBLICATIONS

Video Electronics Standards Association, Display Power Management Signaling (DPMS) Standard, Aug. 20, 1993.*
AIX Version 4.3 AIXwindows Programming Guide, Oct. 1997.*
Video Electronics Standards Association, "VESA Enhanced Extended Display Identification Data Standard", Feb. 9, 2000.*

(Continued)

*Primary Examiner*—Chun Cao
*Assistant Examiner*—Albert Wang
(74) *Attorney, Agent, or Firm*—Haynes and Boone, LLP

(57) ABSTRACT

An information handling system (IHS) stores display characteristics information of the last display coupled to the IHS prior to a boot or suspend/resume operation. Upon receipt of a boot or resume command, time is saved by the IHS using the last display characteristics information to activate the current display if the current display characteristics information is the same as the last display characteristics information. Otherwise, the display is reinitialized which consumes more time in the boot or resume process.

35 Claims, 3 Drawing Sheets

OTHER PUBLICATIONS

ACPI—"Instant On, Suspend to RAM", Mar. 28, 2000.*
Video Electronics Standards Association, E-EDID Implementation Guide, Jun. 4, 2001.*
Microsoft WinHEC, "Toward a Standard User Interface for Power Controls", Mar. 4, 2002.*
Compaq Corporation, Intel Corporation, Microsoft Coprporation, Phoenix Technologies LTD., Toshiba Corporation, "Advanced Configuration and Power Interface Specification", Rev 2.0b, Oct. 11, 2002.*
"System Power States", Feb. 2003.*
"System Sleep Criteria", Feb. 2003.*
"System Wake-up Events", Feb. 2003.*
"System Power Management Events", Feb. 2003.*
"Windows XP Kernel Enhancements", Mar. 24, 2003.*
"The Evolution of the Green PC: Towards Integrated Power Management", Mar. 26, 2003.*
"PC Monitor DPMS specification explanation", Apr. 14, 2003.*
Simple Boot Flag Specification Overview, Apr. 16, 2003.*
"Dual-Input Monitor Identification Scheme", U.S. Appl. No. 09/491,072, filed Jan. 25, 2000.*
"Method and Apparatus for Associating Display Configuration Information with Respective Displays of an Information Handling System", U.S. Appl. No. 10/423,248, filed Apr. 25, 2003.*

* cited by examiner

100

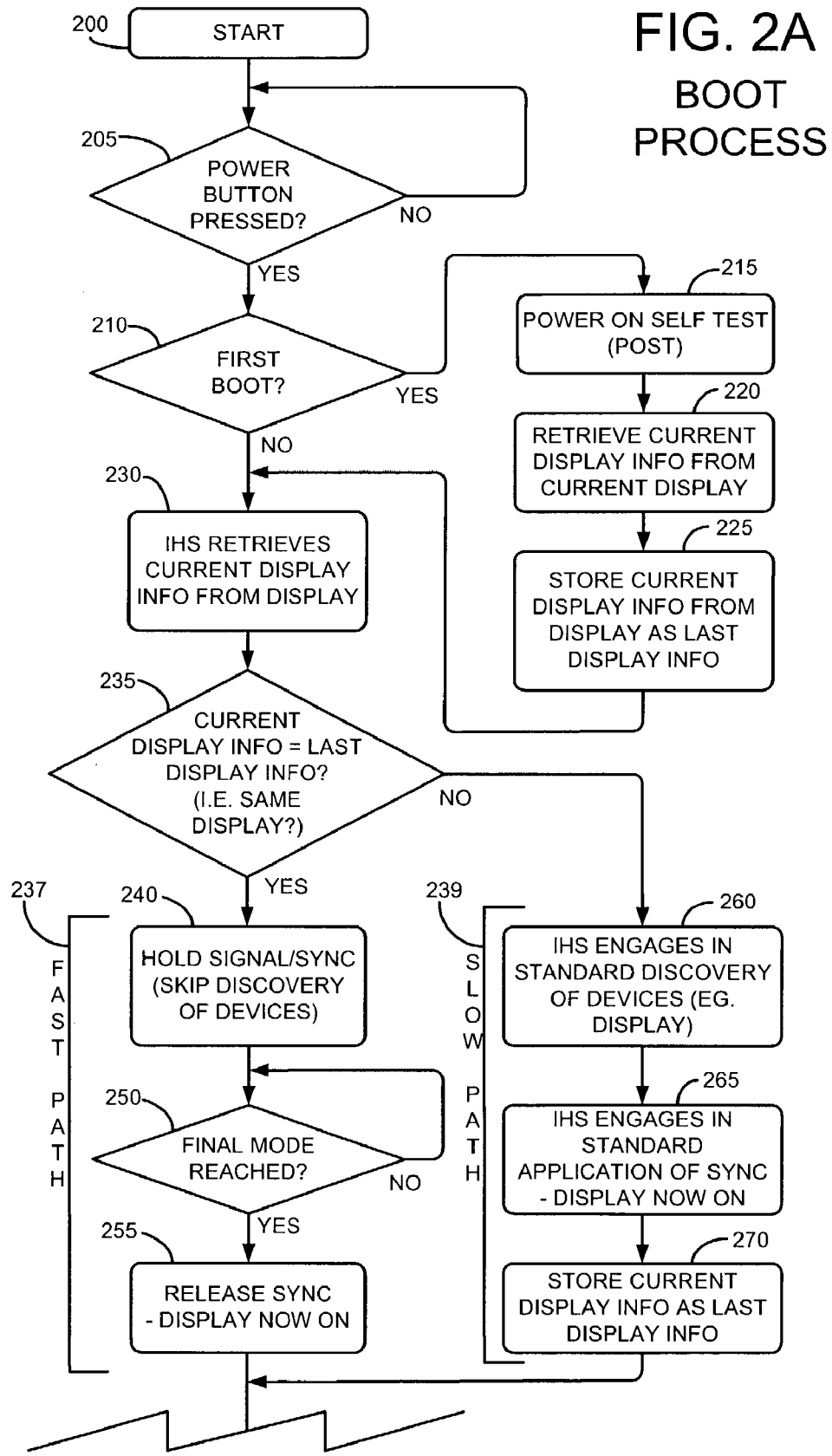

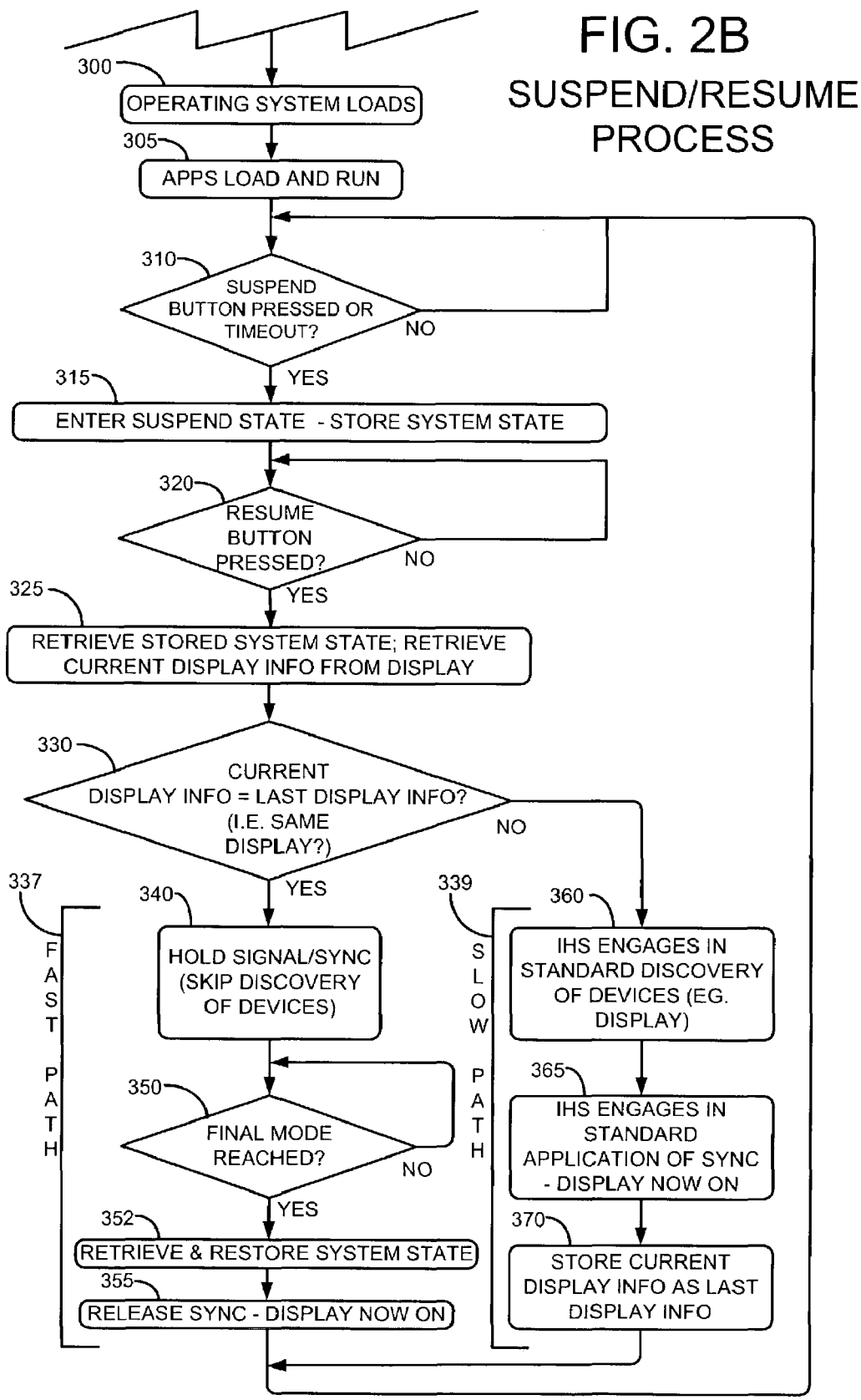

METHOD AND APPARATUS FOR CAPTURING DISPLAY CHARACTERISTIC INFORMATION TO ACHIEVE FASTER BOOT AND RESUME OF AN INFORMATION HANDLING SYSTEM

BACKGROUND

The disclosures herein relate generally to information handling systems and more particularly to information handling systems which exhibit a decrease in the amount of time needed to achieve a usable state.

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While modern information handling systems have become faster and faster as our technology progresses, further improvement is still desirable. The process of booting an information handling system often takes a significant amount of time. Reducing boot time is very desirable to the system user. Many factors contribute to delays in booting an information handling system. For example, Basic Input Output System (BIOS) Power On Self Test (POST) checks, memory checks, driver loading and hardware discovery are all factors which contribute to boot time. Significant time is consumed when the information handling system discovers the display hardware coupled to the system. A typical information handling system interrogates the display each time the system is booted to learn the capabilities of the display, such as its available resolutions and refresh rates, for example. All of this takes time.

Moreover, significant time is also consumed when a conventional information handling system resumes from a suspend state. Known information handling systems save power by entering a low power suspend state after a predetermined amount of time from an input event has transpired. For example, hard drives can be spun down and the clock frequency of the system's processor can be throttled back to reduce energy consumption. The display portion of the system can also enter a low power suspend state to conserve power. Unfortunately however, when the system is commanded to resume from the suspend state, substantial time can be consumed while the system rediscovers the display and its available operating modes.

Therefore, what is needed is an information handling system which boots and resumes from suspend state more quickly. In short, it is desirable that the system achieves, or returns to, a usable state as soon as possible.

SUMMARY

Accordingly, in one embodiment, a method of operating an information handling system (IHS) is disclosed which includes the IHS retrieving current display characteristics information from a display currently coupled to the IHS. The method also includes the IHS comparing the current display characteristics information with last display characteristics information from a last display previously coupled to the IHS. The method further includes the IHS activating the current display using the last display characteristics information if the last display characteristics information is found to be the same as the current display characteristics information, and otherwise reinitializing the current display.

In another embodiment, a method of operating an information handling system is disclosed which includes the IHS entering a suspend state in response to an event. The method further includes the IHS retrieving current display characteristics information from a display currently coupled to the IHS. The method still further includes the IHS comparing the current display characteristics information with last display characteristics information from a last display coupled to the IHS prior to entering the suspend state. The IHS resumes operation of the display using the last display characteristics information if the last display characteristics information is found to be the same as the current display characteristics information. Otherwise the display is reinitialized.

A principal advantage of the embodiments disclosed herein is that the IHS becomes operational more quickly.

BRIEF DESCRIPTION OF THE DRAWINGS

FIG. 2A is a flowchart showing the boot process flow of the information handling system of FIG. 1.

FIG. 2B is a flowchart showing the suspend and resume process flow of the information handling system of FIG. 1.

DETAILED DESCRIPTION

Figure 1:
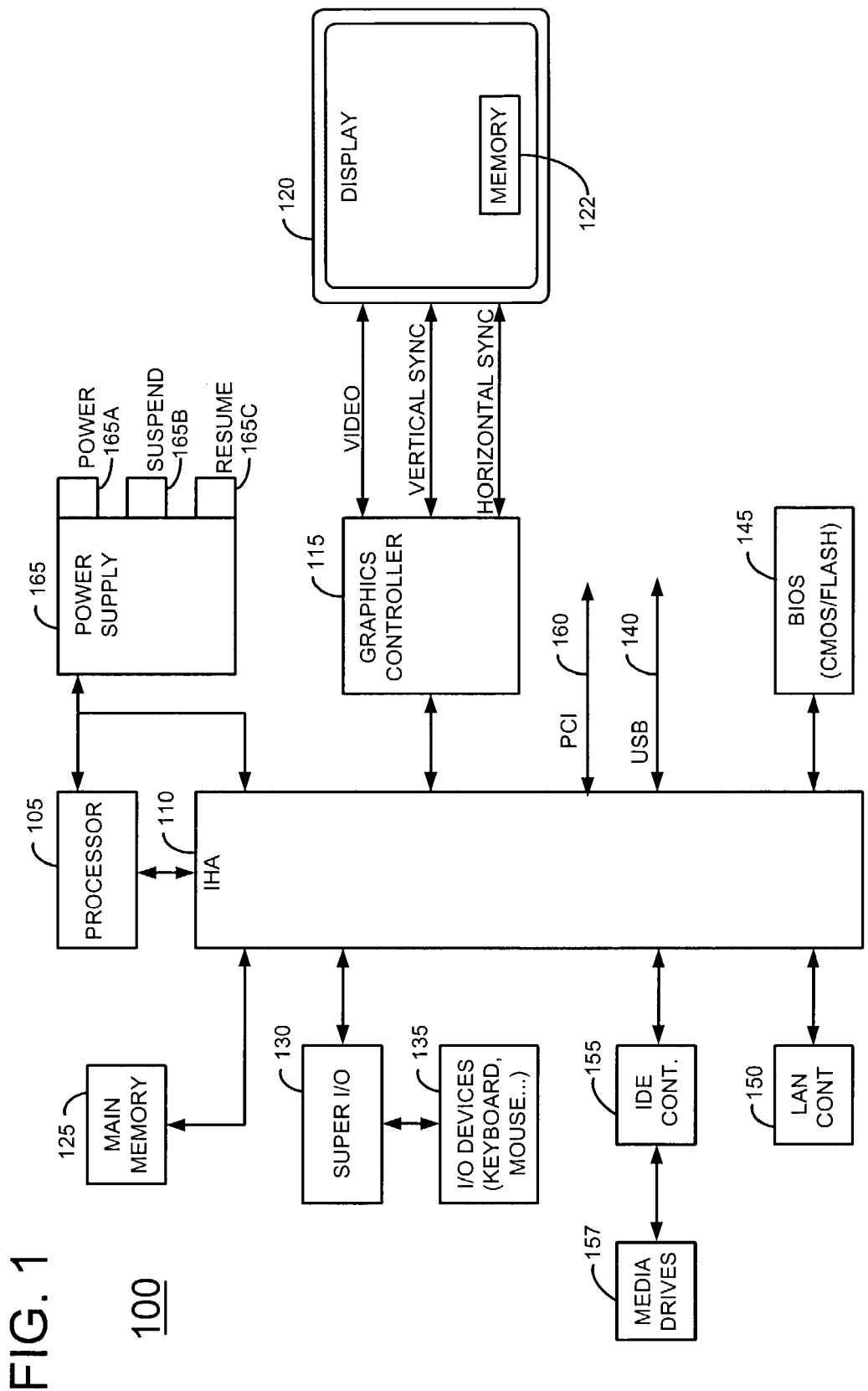
FIG. 1 is a block diagram of the disclosed information handling system.

As discussed earlier, it is desirable that an information handling system (IHS) boots as quickly as possible and that it resumes operation from a power saving suspend state as quickly as possible. One technique often employed to achieve faster boot times is the use of a simple boot flag (SBF). The SBF is typically stored in a CMOS BIOS register. When an IHS boots for the first time several tests and diagnostics are typically run to assure that the system is performing properly. After successfully running these tests on the first boot, the SBF is set. Subsequent boots of the system check to see if the SBF is set and, if so, the tests are not run. Substantial savings in time are thus achieved by not running extensive tests every time the system boots.

A number of power savings measures which affect performance are employed in conventional information handling systems. For example, according to the Advanced Configuration and Power Interface (ACPI) industry standard, the states listed below in Table 1 can be entered by the IHS.

TABLE 1

| Sleep States | Description | Speed to Full On |
| --- | --- | --- |
| S0 | System working state (full on) | Faster (already on) |
| S1 | reserved | reserved |
| S2 | reserved | reserved |
| S3 | Standby-system attributes saved to memory | Short recovery time |
| S4 | Hibernate-system attributes saved to file on hard drive | Longer recovery time than S3 |
| S5 | System off (full off) | Slowest |

In the S0 state the system is fully on, whereas in the S5 state the system is fully off. When the system enters the S3 standby sleep state, the contents of the system's memory are saved in random access memory (RAM) and the IHS enters a reduced power state. The S3 sleep state is sometimes referred to as the "suspend to RAM" sleep state. Some power savings are achieved while in the S3 sleep state and recovery time to the system working state, S0, is relatively fast. However, when the system enters the S4 hibernate sleep state, the contents of system memory are saved to nonvolatile memory, such as a hard disk or a solid state storage device. Greater power savings are achieved in the S4 sleep state. However it takes longer for the system to recover from the S4 sleep state than the S3 sleep state. The S4 sleep state is sometimes referred to as the "suspend to disk" sleep state. For purposes of this discussion, entering these sleep states is referred to as a "suspend operation" while recovering from these sleep states and becoming fully powered up again is referred to as a "resume operation", or more simply, suspend and resume.

When a conventional information handling system first boots, significant time is taken while the IHS receives information from the display. For example, the IHS reads Extended Display Identification Data (EDID) information from the display to determine the resolution modes and refresh rates of which the display is capable. Several resynchronizations of the display can occur during the boot process, all of which consume valuable time.

In conventional information handling systems, substantial time can be consumed recovering from suspend operations such as the S3 standby sleep state where the system's state is stored in memory. Even more time is consumed when the IHS recovers from the S4 hibernate sleep state where the system's state is stored in non-volatile storage such as a hard drive. Multiple resynchronizations of the display are needed when recovering from standby and hibernate sleep states, and this can take substantial time.

The display of an information handling system can also consume a significant amount of energy. To conserve energy the Digital Power Management (DPM) standard provides that an IHS's display can be suspended to a low power suspend state.

FIG. 1 is a block diagram of the disclosed information handling system 100 which is capable of booting more quickly and recovering from suspend state more quickly than the prior information handling systems described earlier. For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In this particular embodiment, information handling system (IHS) 100 includes a processor 105 such as an Intel Pentium series processor or one of many other processors currently available. An Intel Hub Architecture (IHA) chipset 110 provides IHS system 100 with graphics/memory controller hub functions and I/O functions. More specifically, IHA chipset 110 acts as a host controller which communicates with a graphics controller 115 coupled thereto. A display 120 is coupled to graphics controller 115. Display 120 includes a nonvolatile memory 122 which stores display information such as the type of monitor, the resolutions of which the monitor is capable, the refresh rates of which the monitor is capable and other information descriptive of the display. Such information includes the EDID information described earlier and other monitor capability information. Chipset 110 further acts as a controller for main memory 125 which is coupled thereto. Chipset 110 also acts as an I/O controller hub (ICH) which performs I/O functions. A super input/output (I/O) controller 130 is coupled to chipset 110 to provide communications between chipset 110 and input devices 135 such as a mouse, keyboard, and tablet, for example. A universal serial bus (USB) 140 is coupled to chipset 110 to facilitate the connection of peripheral devices to system 100. A basic input-output system (BIOS) 145 is coupled to chipset 110 as shown. BIOS 145 is stored in CMOS or FLASH memory so that it is nonvolatile.

A local area network (LAN) controller 150, alternatively called a network interface controller (NIC), is coupled to chipset 110 to facilitate connection of system 100 to other information handling systems. Integrated drive electronics (IDE) controller 155 is coupled to chipset 110 so that devices such as media drives 157 can be connected to chipset 110 and processor 105. Devices that can be coupled to IDE controller 155 include CD-ROM drives, DVD drives, hard disk drives and other fixed or removable media drives. An expansion bus 160, such as a Peripheral Component Interconnect (PCI) bus, is coupled to chipset 110 as shown. Expansion bus 160 includes one or more expansion slots (not shown) for receiving expansion cards which provide IHS 100 with additional functionality.

FIG. 2A is a flowchart depicting process flow as IHS 100 communicates with display 120 during boot operations to decrease boot time. The flowchart of FIG. 2A outlines the processes carried out by executable code or firmware stored in nonvolatile storage within IHS 100. Such nonvolatile storage is provided by devices such as media drives 157 or nonvolatile FLASH memory 145. Process flow starts at block 200 and a test is conducted at decision block 205 to determine if power button 165A has been pressed. If the power button has not been pressed then flow continues back to the entry point of block 205. However, if the power button has been pressed, then the IHS tests to determine if this is the first time that the IHS has been booted as per block 210. If it is found that this is the first time that the system has been booted, then testing is conducted to assure that the system is operating properly. More specifically, a power on self test (POST) is conducted as per block 215. The POST includes system diagnostics which check the functionality of memory, media drives, peripherals and hardware components.

After the POST is successfully completed during the first boot, IHS 100 retrieves current display characteristics information from memory 122 in display 210 as per block 220. The current display characteristics information includes display identification information such as vendor ID and product ID or model number information. Display characteristics information also includes display capability information such as the refresh rates at which the display operates (e.g. 75 Hz, 85 Hz . . . ), maximum horizontal image size, maximum vertical image size, display transfer characteristic (gamma), as well as timing and checksum information. Display capability information further includes display resolutions or modes (e.g. 1920×1080; 2048×1536, . . . ). Display capability information still further includes interface type, such as analog Video Graphics Array (VGA) or Digital Visual Interface (DVI), for example. This display capability information is alternatively called display parameter information. Current display characteristics information (or more simply, current display information) is defined as being the display characteristics information stored in the display that is presently connected to IHS 100. Last display characteristics information (or more simply, last display information) is defined as being the display characteristics information contained in the display that was connected to IHS 100 the last time IHS 100 was booted, namely the time prior to the current boot. The first time that IHS 100 is booted, the last display characteristics information will be the current display characteristics information because it is not defined until this point. In block 225 the current display characteristics information that was retrieved from display 120 in block 220 is stored in nonvolatile storage such as one of media drives 157 or FLASH or CMOS memory such as used to store BIOS 145. In preparation for the next time the system is booted, the current display characteristics information that is stored as per block 225 is defined to be last display characteristics state information.

To review, decision block 210 determined that this is the first boot of IHS 100 and as a result system testing (POST) is conducted. If however, decision block 210 determines that this is not the first time that IHS 100 is booted, then this testing is bypassed and the time it takes is avoided. In this instance, process flow continues directly to block 230 at which IHS 100 retrieves the current display information from display 120. A test is then conducted to determine if the current display characteristics information is the same as the last display characteristics information as per decision block 235. This test determines if the display currently connected to IHS 100 is the same display as the last time that the IHS was booted. Many circumstances are encountered where the IHS user changes the display from one operating session to the next. For example, a user may be operating his or her portable computer at a desk equipped with a docking station and an external display. The user then takes the computer home and starts using the computer's integral display. Users also change displays when they take their computer from a daily work area to a presentation area which employs a different display such as a projection display. If decision block 235 determines that the IHS is still using the same display as the last time it was booted, then a high speed or fast path 237 is engaged in which the display can be activated very quickly using the same display characteristics information as was employed the last time the IHS was booted. However, if decision block 235 finds that a different display is being used than the last time the IHS was booted, then a slower speed or slow path 239 is engaged which involves time consuming device discovery and resynchronizations before the display can be activated.

More specifically, if decision block 235 finds that the same display is being used as the last time the IHS was booted, then process flow continues to fast path 237 in which IHS 100 performs a hold in which it holds off sending a video signal and sync signals to display 120 as per block 240. This effectively keeps display 120 in a hold state while graphics controller 115 is allowed to reach the final mode (i.e. the final operating resolution and refresh rate). When a conventional IHS boots it can go through a number of display modes, each of which results in a resynchronization of the display. Each of these resynchronizations caused a delay in prior systems. The disclosed IHS solves this problem by holding off application of the video signal and sync signals, namely horizontal and vertical sync, until the final mode is reached. Also the disclosed IHS 100 saves time in fast path 237 by skipping device discovery as per block 240 as will be described in more detail later. Referring again to FIG. 2A, decision block 250 now tests to see if final mode has been reached. While this test is being conducted, IHS 100 continues to assert a hold on the video signal to the display and the sync signals to the display. When final graphics mode is reached, then IHS 100 releases the hold on the video signal and the sync signals, thus commanding display 120 to turn on. Advantageously, multiple time consuming display resynchronizations are avoided in fast path 237 when the current display is the same as the last display used.

However, if decision block 235 finds that the current display is not the same as the last display used, then IHS 100 commences carrying out the steps of slow path 239. IHS 100 discovers devices as per block 260. In other words, IHS 100 performs tests to determine which devices, such as display 120 are coupled to the IHS. This testing takes valuable time which was avoided in fast path 237. Then, IHS 100 applies horizontal sync, vertical sync and the video signal to display 120. As a result, display 120 is now turned on as per block 265. Then as seen in block 270, IHS 100 stores the current display characteristics information as the last display characteristics information in nonvolatile storage such as one of media drives 157 or FLASH or CMOS memory such as used to store BIOS 145. At this point IHS 100 is defined to be in the booted state.

FIG. 2B illustrates the suspend/resume process which is carried out after IHS 100 is booted. The flowchart of FIG. 2B outlines the processes carried out by executable code or firmware stored in nonvolatile storage within IHS 100. Nonvolatile storage is provided by devices such as media drives 157 or nonvolatile FLASH memory 145. After the system boots, an operating system is loaded as per block 300. For example, an operating system such as Microsoft Windows, Linux, or other operating system is loaded according to the desire of the user. Applications are then loaded and executed as per block 305. IHS 100 is capable of being placed in a suspend state to conserve power. Referring to FIG. 1, IHS 100 is equipped with a power supply 165 to which a power on/off button 165A, suspend button 165B and resume button 165C are coupled. In actual practice the suspend and resume buttons can be implemented as one button, namely a button which is pressed once to place the system in suspend mode and which is pressed a second time to cause the system to resume normal operation. It is also possible that the power on/off, suspend and resume buttons all be the same button as is common in conventional IHS's. The power on/off, suspend and resume buttons are also referred to as actuators. Power supply 165 is shown in FIG. 1 as being connected to processor 105 and chipset 110 to provide power thereto. Power supply 165 is also connected to provide power to the remaining components of IHS 100; however for clarity in FIG. 1 each connection is not specifically shown.

Returning to the suspend/resume process flowchart of FIG. 2B, as per block 310 a test is conducted to determine if an event such as the pushing of suspend button 165B or a timeout has occurred. A timeout occurs if there has been no user input or system activity for more than a predetermined amount of time. The timeout time period can be set by the user. Once the timeout time period is exceeded, IHS 100 goes into suspend mode. More particularly, if it is found in decision block 310 that the suspend button has been pressed or a timeout has occurred, then IHS 100 enters a low power suspend state as per block 315. This low power suspend state can be one of two representative low power states, for example, the S3 standby suspend state or the still lower power S4 hibernate suspend state. In one embodiment, IHS 100 enters the S3 suspend state when suspend button 165B is pressed or after a first timeout time period, for example, 30 minutes has transpired. After a second additional time period, for example 60 minutes transpires, then IHS 100 enters the lower power S4 suspend state. The first and second timeout time periods are selectable by the user. In the S3 suspend state, also called "suspend to RAM", the state of the system is stored in system memory 125. In the S4 suspend state, also called the hibernate suspend state, the state of the system is stored as a file in nonvolatile storage such as media drives 157 or the FLASH memory 145 in which system BIOS is stored.

In both the S3 and S4 suspend states, the state of the system is stored. More particularly, the system state which is saved includes applications and drivers. If a word processing application was open when the system was put into suspend state, the application will resume in the same state as when it was suspended. If a window was open upon suspend, the window will be open upon resume. As part of the system state that is saved, the operating system state is saved. Graphics resolution and timings are saved as part of the operating system state. System devices are fully operational upon resume since their state has been stored and is used to reactivate devices upon resume. It is also noted that display 120 itself enters a low power suspend state to conserve energy. Displays manufactured to the specifications of the Display Power Management (DPM) video standard are capable of a low power suspend state and may be used in IHS 100 as display 120.

Once the suspend state is entered, the IHS monitors for a resume command such as the pressing of resume button 165C as per decision block 320. If the system finds that the resume button has been pressed, then process flow continues to block 325 at which the previously stored system state is retrieved and restored to the system. The current display characteristics information is retrieved from the display 120 that is now coupled to graphics controller 115. A test is undertaken at decision block 330 to determine if the current display characteristics information is the same as the last display characteristics information. If the current display characteristics information is the same as the last display characteristics information, then the display has not been changed during the time the IHS was in the suspend state or mode. In this case, IHS 100 enters a high speed or fast path 337 in which the display can be activated very quickly using the same display information as was employed when the IHS went into suspend state. However, if decision block 330 finds that a different display is being used than when the IHS went into the suspend state, then a slower speed or slow path 339 is engaged which involves time consuming device discovery and resynchronizations before the display can be activated.

More specifically, if decision block 330 finds that the same display is being used as when the IHS entered the suspend state, then process flow continues to fast path 337 in which a hold signal/sync command is sent to display 120 instructing display 120 to hold while graphics controller 115 is allowed to reach the final mode (i.e. the final operating resolution and refresh rate). When a conventional IHS resumes from suspend state, it can cycle through a number of display modes, each of which results in a resynchronization of the display. These resynchronizations caused delays in resume from suspend state operations in prior systems. In such conventional systems, time is also taken by the system rediscovering devices such as the display during a resume from suspend operation. As per block 340 the disclosed IHS solves these problems by holding off application of the video signal and sync signals to display 120 until the final video mode is reached. In other words, as the operating system causes a cycling of video modes during a resume from suspend operation, the IHS holds the video signal and sync signals from being applied to display 120. When final graphics mode is reached and this is detected in decision block 350, then as per block 352 the state of the system is retrieved from memory if the system was in an S3 suspend state, or is retrieved from nonvolatile storage if the system was in the S4 suspend state. The system is then restored with the retrieved state information. IHS 100 then releases the hold on the video signal and sync signals to display 120 and display 120 turns on and resumes as per block 355. Advantageously, time consuming display resynchronizations are avoided in fast path 337 when the current display is the same as the last display used prior to the suspend operation.

However, if decision block 330 finds that the current display is not the same as the last display used prior to the suspend operation, then IHS 100 commences carrying out the steps of slow path 339. More particularly, IHS 100 discovers devices as per block 360 by re-performing tests to determine which devices, such as display 120 are coupled to the IHS. This testing takes valuable time which was avoided in fast path 337. Once this testing is complete, then IHS 100 applies horizontal sync, vertical sync and the video signal to display 120. As a result, display 120 is now turned on as per block 365. Then as seen in block 370, IHS 100 stores the current display characteristics information as the last display characteristics information in nonvolatile storage such as one of media drives 157 or FLASH or CMOS memory such as used to store BIOS 145. At this point IHS 100 is defined to be back in an operational state with the ability to execute software applications for the user. In this manner, both boot time and resume from suspend state times are advantageously improved.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of operating an information handling system (IHS) comprising:
   retrieving current display characteristics information from a current display;
   comparing the current display characteristics information with last display characteristics information from a last display employed in prior operation of the IHS; and
   activating the current display using the last display characteristics information if the last display characteristics information is the same as the current display characteristics information via a first path in which the current display is activated quickly, and otherwise via a second path in which tests are performed before the current display is activated.

2. The method of claim 1 further comprising the step of receiving a boot command prior to the retrieving step.

3. The method of claim 1 wherein the current display characteristics information and the last display characteristics information are display capability information.

4. The method of claim 1 wherein the current display characteristics information and the last display characteristics information are display identification information.

5. The method of claim 1 wherein the current display characteristics information and the last display characteristics information are EDID information.

6. The method of claim 1 wherein the current display and the last display are different.

7. The method of claim 1 wherein the current display and the last display are the same.

8. A method of operating an information handling system (IHS) comprising:
   entering, by the IHS, a suspend state in response to an event;
   retrieving, by the IHS, current display characteristics information from a display currently coupled to the IHS;
   comparing, by the IHS, the current display characteristics information with last display characteristics information from a last display coupled to the IHS prior to entering the suspend state; and
   resuming operation of the display using the last display characteristics information if the last display characteristics information is the same as the current display characteristics information via a first path in which the current display is activated quickly, and otherwise via a second path in which tests are performed before the display is activated.

9. The method of claim 8 further including receiving a resume command prior to the retrieving step.

10. The method of claim 8 further including storing, by the IHS, last display characteristics information in a nonvolatile memory.

11. The method of claim 8 wherein the current display characteristics information and the last display characteristics information are display capability information.

12. The method of claim 8 wherein the current display characteristics information and the last display characteristics information are display identification information.

13. The method of claim 8 wherein the current display characteristics information and the last display characteristics information are EDID information.

14. The method of claim 8 further comprising receiving, by the IHS, a resume command and in response performing the retrieving, comparing and activating steps.

15. The method of claim 10 wherein the nonvolatile memory is a media drive.

16. The method of claim 10 wherein the nonvolatile memory is solid state storage device.

17. The method of claim 8 wherein the suspend state is a standby state.

18. The method of claim 8 wherein the suspend state is a hibernate state.

19. An information handling system (IHS) comprising:
   a processor;
   a memory coupled to the processor;
   nonvolatile storage, coupled to the processor, for storing current display characteristics information from a display currently coupled to the IHS and for storing last display characteristics information from a display previously coupled to the IHS; and
   executable code stored in the nonvolatile storage for comparing the current display characteristics information with the last display characteristics information and for activating the current display using the last display characteristics information if the last display characteristics information is the same as the current display characteristics information via a first path in which the current display is activated quickly, and otherwise via a second path in which tests are performed before the current display is activated.

20. The information handling system of claim 19 wherein the IHS executes the executable code in response to a boot command.

21. The information handling system of claim 19 wherein the nonvolatile storage is a hard disk drive.

22. The information handling system of claim 19 wherein the nonvolatile storage is a FLASH memory.

23. The information handling system of claim 19 wherein the current display characteristics information and the last display characteristics information are display capability information.

24. The information handling system of claim 19 wherein the current display characteristics information and the last display characteristics information are display identification information.

25. The information handling system of claim 19 wherein the current display characteristics information and the last display characteristics information are EDID information.

26. An information handling system (IHS) comprising:
   a processor;
   a memory coupled to the processor;
   nonvolatile storage, coupled to the processor, for storing current display characteristics information from a display currently coupled to the IHS and for storing last display characteristics information from a display coupled to the IHS before a suspend event; and
   executable code stored in the nonvolatile storage for causing the IHS to enter a suspend state in response to the suspend event and in response to a resume event resuming operation of the display using the last display characteristics information if the last display characteristics information is the same as the current display characteristics information via a first path in which the current display is activated quickly, and otherwise via a second path in which the tests are performed before the current display is activated.

27. The information handling system of claim 26 wherein the suspend event is a timeout.

28. The information handling system of claim 26 wherein the suspend event is actuation of an actuator by a user.

29. The information handling system of claim 26 wherein the resume event is the actuation of an actuator by a user.

30. The information handling system of claim 26 wherein the current display characteristics information and the last display characteristics information are display capability information.

31. The information handling system of claim 26 wherein the current display characteristics information and the last display characteristics information are display identification information.

32. The information handling system of claim 26 wherein the current display characteristics information and the last display characteristics information are EDID information.

33. The information handling system of claim 26 wherein the suspend state is a standby state.

34. The information handling system of claim 26 wherein the suspend state as a hibernate state.

35. The information handling system of claim 26 wherein the suspend state includes a display low power state.

* * * * *

UNITED STATES PATENT AND TRADEMARK OFFICE
CERTIFICATE OF CORRECTION

| | | |
|---|---|---|
| PATENT NO. | : 7,082,529 B2 | Page 1 of 1 |
| APPLICATION NO. | : 10/423150 | |
| DATED | : July 25, 2006 | |
| INVENTOR(S) | : Thomas Cantwell et al. | |

It is certified that error appears in the above-identified patent and that said Letters Patent is hereby corrected as shown below:

In the (54) Title

Delete "Characteristic" and replace with --Characteristics--

Signed and Sealed this

Twenty-eighth Day of November, 2006

JON W. DUDAS
*Director of the United States Patent and Trademark Office*